Dec. 8, 1964   F. W. KRUSE, JR   3,160,808
ALTERNATING CURRENT VOLTAGE REGULATOR
Filed June 2, 1960   2 Sheets-Sheet 1
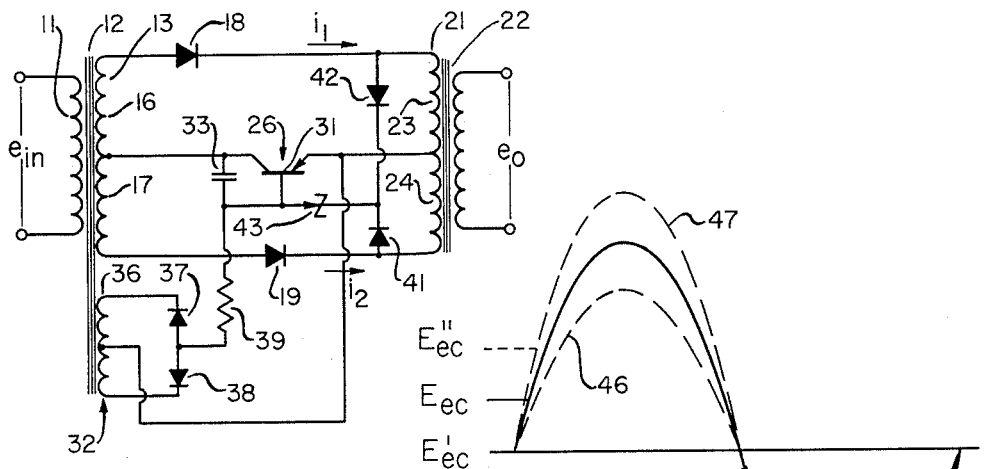
FIG. 1
FIG. 11
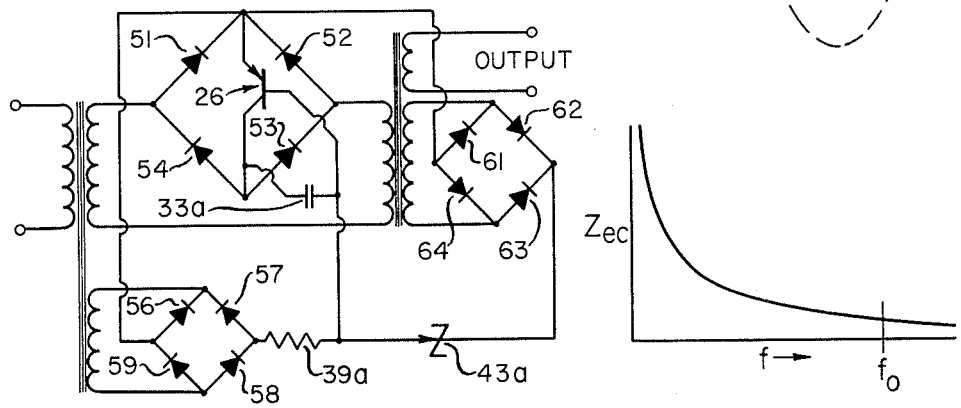
FIG. 12
FIG. 2
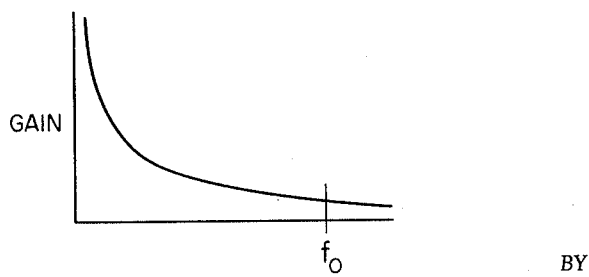
FIG. 3
FRED W. KRUSE JR.
INVENTOR
BY
ATTORNEY

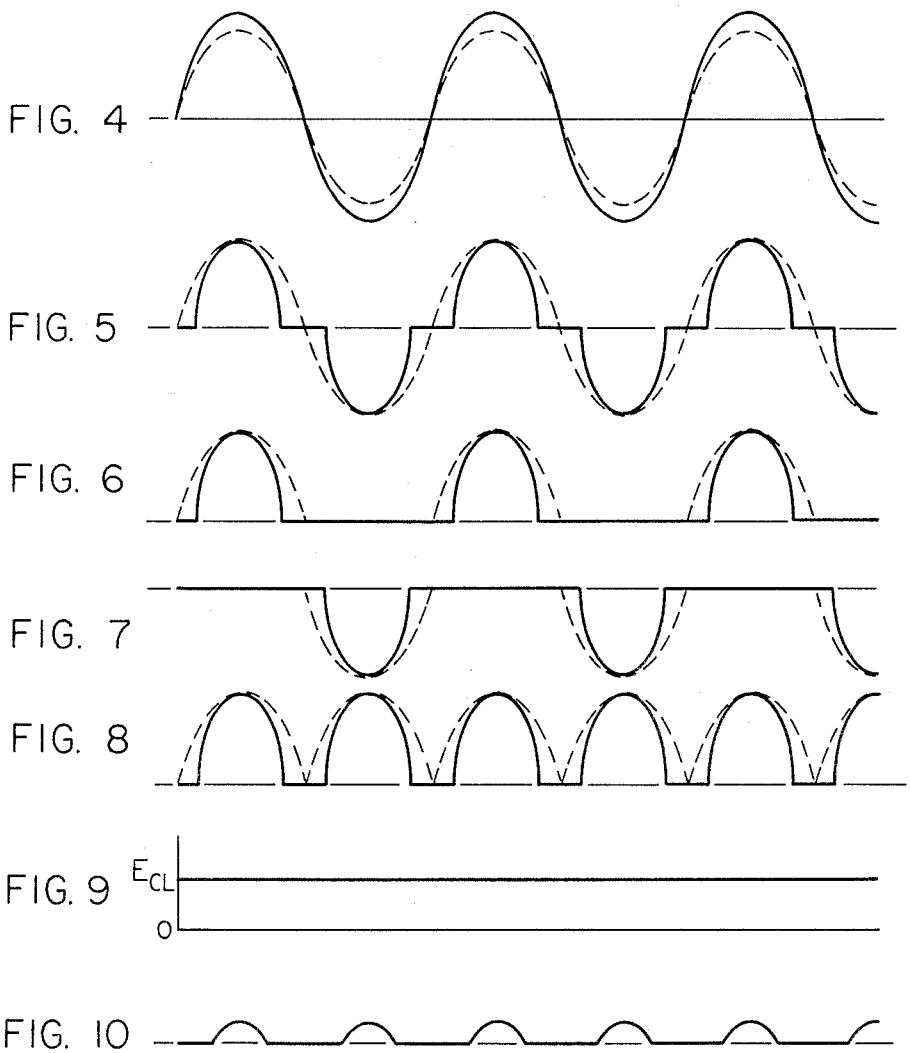

_United States Patent Office_ 3,160,808
Patented Dec. 8, 1964

3,160,808
ALTERNATING CURRENT VOLTAGE REGULATOR
Fred W. Kruse, Jr., Palo Alto, Calif., assignor to Alfred Electronics, Palo Alto, Calif., a corporation of California
Filed June 2, 1960, Ser. No. 33,564
15 Claims. (Cl. 323—22)

This invention relates generally to an alternating current voltage regulator.

Regulating transformers have been employed in the prior art to regulate alternating current voltages supplied from an alternating current source to load. Such transformers include a frequency sensitive compensating circuit which acts to correct for voltage variations in the input. Consequently, the transformers are designed and rated for particular frequencies and do not operate satisfactorily at other frequencies.

It is a general object of the present invention to provide an alternating current voltage regulator which is adapted to operate over a broad range of frequencies without adjustment.

It is another object of the present invention to provide an alternating current voltage regulator which includes at least one rectifier having a back voltage applied thereto to control its period of conduction to regulate the alternating current output voltage.

It is a further object of the present invention to provide an alternating current voltage regulator which includes an active element which serves to apply a back voltage to rectifiers to control the voltage applied to a load.

It is still a further object of the present invention to provide an alternating current voltage regulator which regulates against source and load variations.

These and other objects of the invention are, in general, achieved by employing a circuit which includes at least one rectifier and an active element serially connected to a load. The active element is selected to have a relatively low impedance at the frequency of the alternating current which is regulated and a relatively high variable direct current impedance. Means are provided for sensing the output voltage and deriving a signal which serves to control the direct current impedance. Direct currents flowing through the active element develop the back voltage which controls the point in an alternating current cycle at which the rectifier begins to conduct.

The foregoing and other objects of the invention will become more clearly apparent from the following descriptions when taken in conjunction with the accompanying drawing.

Referring to the drawing:

FIGURE 1 is a circuit diagram of an alternating current voltage regulator in accordance with the invention;

FIGURE 2 shows the impedance frequency characteristics of the active element employed in the circuit of FIGURE 1;

FIGURE 3 schematically shows the gain frequency characteristics of the active element employed in FIGURE 1;

FIGURE 4 shows a typical input voltage waveform;

FIGURE 5 shows a typical output voltage waveform for the circuit of FIGURE 1;

FIGURES 6 and 7 show the current waveform of currents flowing through the rectifiers;

FIGURE 8 shows the current waveform of currents flowing through the active element;

FIGURE 9 shows the voltage across the active element;

FIGURE 10 shows a typical regulating or control voltage;

FIGURE 11 schematically illustrates the operation of the circuit to regulate against input voltage variations; and FIGURE 12 is a circuit diagram of another alternating current voltage regulator incorporating the invention.

Referring to FIGURE 1, the alternating current supply voltage $e_{in}$ is applied to the terminals of the primary winding 11 of the transformer 12. The transformer includes a center tapped secondary winding 13 having winding portions 16 and 17. Rectifiers 18 and 19 have one terminal connected to the adjacent terminals of the secondary winding 13 and the other terminal connected to the adjacent terminal of the primary winding 21 of the output transformer 22. The primary winding 21 is center tapped to provide winding portions 23 and 24.

An active element 26 is connected between the center taps of the secondary winding 13 of the input transformer and the primary winding 21 of the output transformer. The active element is such that it will present a small or negligible impedance to alternating currents flowing through the same, and a relatively high variable impedance for direct currents.

A suitable element may comprise a transistor 31 which has its emitter and collector serially connected between the center taps. The base of the transistor is connected to a bias current supply 32. An integrating or feedback capacitor 33 is connected between the collector and base of the transistor. As will be presently described, the capacitor 33 provides means whereby, alternating current voltages appearing at the collector are fed back to the base to reduce the alternating current gain of the transistor and the alternating current impedance from emitter to collector. Since there is no direct current feedback, the direct current impedance from emitter to collector remains relatively high and is dependent upon the base current drawn from the transistor.

The base current may be supplied by a full wave rectifier which receives power from the alternating current supply through the secondary winding 36. Rectifiers 37 and 38 provide full wave rectified voltage to one terminal of the resistor 39 to draw current from the base of the transistor 31. The center tap of the transformer winding 36 is connected to the emitter. As is well known, the base current drawn serves to control the gain of the amplifier and the impedance presented between emitter and collector.

Thus far then, there is described a means for providing a low alternating current impedance with a high direct current impedance in series with the line connecting the center taps of the transformer windings 13 and 21.

Means are additionally provided for sensing the output voltage and deriving a regulating signal which serves to control the base current to vary the direct current emitter to collector impedance. As the impedance is varied, the direct current voltage drop between emitter and collector, $E_{ec}$, provides varying back voltage to the diodes 18 and 19, to control the portion of the alternating current cycle during which they are conductive.

The sensing circuit may comprise a pair of serially connected oppositely poled diodes 41 and 42 connected between the terminals of the output winding 21. A Zener or voltage regulating diode 43 has one terminal connected to the common terminal of the diodes 41 and 42, and its other terminal connected to the base of the transistor 31. The Zener breakdown or regulating voltage is selected so that when the output voltage is at a correct level, the voltage appearing on the Zener will serve to provide some conduction of pulsating direct current. The waveform is illustrated in FIGURE 10. The current drawn subtracts from the base current to decrease same.

Operation of the circuit described may more clearly be understood by referring to FIGURES 2–10. FIGURE 2 shows a plot of impedance from emitter to collector $Z_{ec}$ as a function of frequency $f$ for a suitable active element. It is seen that the impedance presented from emitter to collector is relatively high at low frequencies and direct current and tends to decrease as the frequency increases. At the frequency $f_0$, which is the operating frequency, the alternating current impedance is almost negligible. In the transistor circuit this characteristic is obtained by providing feedback through the capacitor 33. In essence then, there can be only very small alternating current voltages across the emitter to collector leads.

Suitable gain characteristics for the active element are shown in FIGURE 3. The gain is high for direct current and relatively low frequencies. The gain is low at the operating frequency $f_0$. This characteristic, although not essential, provides a voltage $E_{ec}$ which is almost pure direct current voltage in spite of the fact that the base current is a pulsating direct current and that the current flowing through the device is pulsating.

Referring to FIGURE 4, a typical sine wave input is shown; the solid line portion shows normal input while the dotted portion shows a reduction of the input voltage. A typical ouput voltage is shown in FIGURE 5; the solid line shows the output for normal input and the dotted line the output for reduced input voltage. The current through the rectifiers for the foregoing conditions is shown in FIGURES 6 and 7. Referring to FIGURE 8, it is noted that the current flowing through either of the rectifiers will flow through the common leg in the same direction thereby giving effectively a pulsating direct current. The direct current flowing through the relatively high impedance path between emitter and collector gives rise to a back voltage $E_{ec}$ as shown in FIGURE 9. It is noted that this voltage will be in opposition to the voltage supplied to the rectifiers, and thus the rectifiers will be prevented from conducting until the voltage across the same exceeds the back voltage. The sampling circuit connected to the Zener diode 43 samples the output voltage and serves to draw a current of the type shown in FIGURE 10.

Operation of the circuit to regulate can be understood with reference to FIGURE 11 and the preceding figures. Assume that the input voltage decreases, as shown by dotted curve 46, FIGURE 11. Then, the output voltage will tend to decrease. The conducting period of the Zener diode 43 will decrease and the base current will increase. The impedance will decrease and the voltage drop $E_{ec}$ will decrease to $E_{ec}'$ reducing the back voltage whereby conduction starts at an earlier portion of the cycle. If the voltage increases as shown at 47, opposite action takes place to increase the impedance and the voltage $E_{ec}$ to $E_{ec}''$. In both instances the amplitude of the output voltage remains substantially constant.

As is well known, the collector current in a transistor is controlled by the base current. In the illustrative circuit, the base current of the transistor is never greater than that which flows when the Zener diode is not conducting. That is, when the base current is controlled entirely by the current through resistor 39.

When the output is shorted out, the current through the Zener diode reduces to zero and the maximum current through the transistor is limited by the base current which, in turn, is limited by the resistor 39.

Apparatus in accordance with the foregoing was constructed in which the various components were as follows: transformer 11 had a ratio of 115:70 to provide 35 volt R.M.S. across each of the winding portions with 115 applied; winding 36 had a turns ratio of 115:50 to provide 25 volts runs across the winding portions; the output transformer had a turns ratio of nominally 50:120; rectifiers 18 and 19 were 1N1124; rectifiers 37, 38, 41 and 42 were 1N2069; Zener diode 43 was 10M39Z10; transistor 31 was 2N511A; feedback capacitor 33 was 50 microfarads; and base resistor 39 was 560 ohms.

A circuit in accordance with the foregoing was operated with a nominal input voltage of 115 volts and a 40 watt load. The input voltage was varied between 105 and 125 volts while the measured output voltage remained at 120 volts within ±.3 volt.

The system described senses the peak value. By employing an averaging circuit in the sensing means, the average voltage can be regulated. Such a circuit might comprise an inductor and capacitor connected in circuit with the Zener diode.

It is apparent that in the above invention only a single rectifier and an active element may be employed to provide in effect single wave voltage regulated power. A pentode or other suitable vacuum tube may be substituted for the transistor to give similar characteristics to the active element. Other constant voltage devices, such as a glow discharge tube, battery, etc., may be substituted for the Zener diode. A higher output and better regulation may be achieved by providing the active element with an amplifier.

An alternating current regulator may be constructed without employing center tapped transformers. Referring to FIGURE 12, a voltage regulator which incorporates a full wave rectifier is illustrated. The rectifiers 51–54 are connected in a rectifying bridge configuration.

Active element 26 provides back voltage to the rectifiers. The base current is obtained from a full wave rectifier including rectifiers 56–59 coupled to the base through resistor 39a. Other parts carry like reference numbers. Sampling and control is done by the sensing bridge rectifier including rectifiers 61–64 and the Zener diode 43a. The bridges may be replaced by two rectifiers and a center tapped winding, if desired. Operation of the element to provide a back voltage is as described hereinabove.

In summary then, there is provided an alternating current voltage regulator which includes diodes together with an active element having a relatively low alternating current impedance and a variable direct current impedance across which is developed a voltage which controls the conduction cycle of the rectifier. Means are provided for sensing the output voltage and varying the resistance of the active element to thereby control the period of conduction to control the output voltage.

I claim:

1. An alternating current peak voltage regulator for supplying peak regulated alternating current voltage from an alternating current source comprising at least one rectifier, a load and an active element all serially connected, said active element having a relatively low impedance at the frequency of the alternating current source and a continuously variable direct current impedance, means for deriving a regulating signal which is dependent upon the alternating current output voltage, and means for applying said signal to the active element to thereby continuously vary its impedance in accordance therewith to regulate the alternating current output voltage.

2. An alternating current voltage regulator as in claim 1 wherein said active element includes an active device having at least three electrodes with a pair of said electrodes serially connected in circuit with the rectifier and load, the other electrode being connected to receive the regulating signal.

3. An alternating current voltage regulator as in claim 1 wherein said active element includes a transistor having emitter, base and collector electrodes, with a pair of said electrodes serially connected in circuit with the rectifier and load, the other electrode being connected to receive the regulating signal.

4. An alternating current voltage regulator as in claim 1 wherein said active element includes a transistor having emitter, base and collector electrodes, said emitter and collector electrodes connected in series with the rectifier and load, means for drawing a base current from the base, and means for applying said regulating signal to the base.

5. An alternating current voltage regulator as in claim 4 wherein a capacitor is connected between a pair of the electrodes to reduce the impedance at the frequency of the alternating current source.

6. An alternating current peak voltage regulator of the type adapted to supply regulated alternating current peak voltage from an alternating current source to a load comprising at least one rectifier, said load and a transistor having emitter, base and collector electrodes with the emitter and collector electrodes connected in the series circuit, capacitive means connected between a pair of said electrodes and serving to reduce the A.-C. impedance of the series circuit, means for supplying a constant base current from the base of sufficient magnitude to maintain said transistor in its fully conductive state, and at least one sampling diode responsive to the alternating current voltage in said load, and a Zener diode responsive to the signal derived by said supplying diode and becoming conductive to provide a regulating signal when the signal from said sampling diode exceeds its breakdown voltage, said regulating signal being applied to said base electrode to draw off base current in accordance with its amplitude to thereby vary the impedance of said transistor.

7. An alternating current peak voltage regulator comprising first and second input terminals adapted to be coupled to an alternating current supply and a common terminal and first and second output terminals adapted to be coupled to a load and a common terminal, a rectifier connected between said first input and first output terminal, a rectifier connected between said second input and second output terminal and an active element connected between the common terminals, said active element having a relatively low impedance at the frequency of the alternating current source and a continuously variable direct current impedance, means for deriving a regulating signal which is dependent upon variations in the alternating current instantaneous output voltage, and means for applying said signal to the active element to thereby continuously vary its impedance in accordance therewith.

8. An alternating current voltage regulator as in claim 7 wherein said active element includes a transistor having emitter, base and collector electrodes, said emitter and collector electrodes connected in series with the rectifier and load, means for drawing a base current from the base, and means for applying said regulating signal to the base.

9. An alternating current voltage regulator as in claim 8 wherein a capacitor is connected between a pair of the electrodes to reduce the impedance at the frequency of the alternating current source.

10. An alternating current voltage regulator as in claim 7 wherein said means for deriving a regulating signal comprises a pair of oppositely poled diodes connected between the first and second output terminals and a constant voltage means having one electrode connected to the active element and the other electrode to the common terminal of the diodes.

11. An alternating current peak voltage regulator comprising an input transformer having primary and a center tapped secondary winding, an output transformer having a center tapped primary winding and at least one secondary winding, a first rectifier serially connected between one terminal of the secondary of the input transformer and one terminal of the primary of the output transformer, a second rectifier connected between the other terminal of the secondary of the input transformer and the other terminal of the primary of the output transformer, an active element connected between the center taps, said active element having a relatively constant impedance at the frequency of the alternating current source and a continuously variable direct current impedance which varies in response to a regulating signal and in opposite direction therewith and including at least three electrodes with a pair of said electrodes serially connected in circuit between the center taps, means responsive to the instantaneous alternating current voltage in said output transformer for deriving said regulating signal which varies as the instantaneous alternating current voltage when exceeding a selected minimum value, and means for applying said signal to the other electrode to thereby continuously vary the impedance of the active element in accordance therewith.

12. An alternating current voltage regulator as in claim 11 in which the active element comprises a transistor having emitter, base and collector electrodes.

13. An alternating current voltage regulator comprising an input transformer having primary and a center tapped secondary winding, an output transformer having a center tapped primary winding and at least one secondary winding, a first rectifier serially connected between one terminal of the secondary of the input transformer and one terminal of the primary of the output transformer, a second rectifier connected between the other terminal of the secondary of the input transformer and the other termnial of the primary of the output transformer, a transistor including emitter, base and collector electrodes connected with the emitter and collector electrodes in series between the center taps of said windings, means for drawing a base current from the base of said transistor, a capacitor connected between a pair of the electrodes of said transistor to reduce the series impedance at the frequency of the alternating current source, a pair of diodes connected between the terminals of the output transformer to sample the voltage across the same, and a constant voltage means connected between the base of the transistor and the common terminal of the diodes to draw a regulating current from the base of the transistor.

14. The method of regulating the peak output voltage in a load circuit coupled to a source of alternating current through a rectifying diode and a return path circuit which last named circuit includes a transistor connected into said circuit by its collector and emitter electrodes, and a capacitor across the base and collector electrode, said method comprising the steps of:

(a) deriving a first signal proportional to the instantaneous output voltage;

(b) applying said first signal to one pole of a Zener diode for deriving a control signal from the other pole of the Zener diode which is proportional to the amount said first signal exceeds the breakdown voltage of said Zener diode;

(c) applying a base current to the base electrode of said transistor of a magnitude selected to make the transistor substantially conductive; and (d) reducing the amplitude of said base current in accordance with the amplitude of said control signal to thereby vary the direct current voltage drop across said transistor in accordance with the amplitude of said control signal to back bias the rectifier diode whereby current conduction through said diode from said source to said load circuit is limited to the time interval during which the alternating current voltage from said source exceeds said back bias.

15. An alternating current peak voltage regulator comprising: a load; a source of alternating current; rectifying diode means; active circuit means responsive to a control signal and operative to change its direct current impedance in accordance with the amplitude of said control signal, said active circuit means including an alternating current impedance which is low at the operating frequency of said source, said source, load, diode means and circuit means being all serially connected; sensing means responsive to the instantaneous alternating current voltage in said load and operative to develop a corresponding sensed signal; direct current voltage reference means for developing a reference signal of a selected amplitude; and control signal circuit means responsive to said reference signal and said sensed signal and operative to develop said control signal proportional to said reference signal and the portion of said sensed signal which exceeds said reference signal, said active circuit means being substantially fully conductive when said control signal is equal to said reference signal and increasing its direct current impedance continuously with increasing amplitude of said sensed signal above said reference signal.

References Cited by the Examiner
UNITED STATES PATENTS

| | | | |
|---|---|---|---|
| 2,275,308 | 3/42 | Niemann | 171—119 |
| 2,664,540 | 12/53 | Beszedics | 323—22 |
| 2,767,365 | 10/56 | Guggi | 318—327 |
| 2,813,244 | 11/57 | Guggi | 323—22 |
| 2,912,635 | 11/59 | Moore | 322—25 |
| 2,928,036 | 3/60 | Walker | 321—8 |
| 2,964,694 | 12/60 | Adams | 323—7 |

RALPH D, BLAKESLEE, *Primary Examiner.*

MILTON O. HIRSHFIELD, LLOYD McCOLLUM,
*Examiners.*